(12) United States Patent
Motohashi

(10) Patent No.: US 7,283,441 B2
(45) Date of Patent: Oct. 16, 2007

(54) INFORMATION RECORDING AND REPRODUCING APPARATUS, DISC APPARATUS AND DEFECT AREA REPLACEMENT METHOD

(75) Inventor: Tsutomu Motohashi, Tokyo (JP)

(73) Assignee: Ricoh Company, Ltd. (JP)

( * ) Notice: Subject to any disclaimer, the term of this patent is extended or adjusted under 35 U.S.C. 154(b) by 543 days.

(21) Appl. No.: 10/768,445

(22) Filed: Feb. 2, 2004

(65) Prior Publication Data

US 2004/0160867 A1    Aug. 19, 2004

(30) Foreign Application Priority Data

Feb. 14, 2003   (JP)   ............................. 2003-035955
Sep. 12, 2003   (JP)   ............................. 2003-321993

(51) Int. Cl.
*G11B 7/00* (2006.01)

(52) U.S. Cl. ................ 369/47.14; 369/53.15; 369/47.15

(58) Field of Classification Search ............ 369/47.14, 369/53.15, 53.17
See application file for complete search history.

(56) References Cited

U.S. PATENT DOCUMENTS

| 5,235,585 | A | * | 8/1993 | Bish et al. | ............... | 369/53.17 |
| 5,623,470 | A | * | 4/1997 | Asthana et al. | .......... | 369/47.49 |
| 5,914,928 | A | * | 6/1999 | Takahashi | ................ | 369/47.14 |
| 6,108,289 | A | | 8/2000 | Hashimoto et al. | | |
| 7,002,882 | B2 | * | 2/2006 | Takahashi | ................ | 369/47.14 |
| 2002/0046319 | A1 | | 4/2002 | Motohashi | | |
| 2003/0031106 | A1 | * | 2/2003 | Ozaki | ..................... | 369/53.17 |
| 2003/0095484 | A1 | | 5/2003 | Motohashi | | |
| 2003/0202782 | A1 | | 10/2003 | Motohashi et al. | | |
| 2003/0237020 | A1 | * | 12/2003 | Wu | .............................. | 714/7 |

FOREIGN PATENT DOCUMENTS

| JP | 07-073571 | 3/1995 |
| JP | 08-249834 | 9/1996 |
| JP | 09-320207 | 12/1997 |
| JP | 11-501760 | 2/1999 |
| JP | 10-302397 | 2/2002 |
| JP | 2002-050110 | 2/2002 |
| JP | 2002-184116 | 6/2002 |
| WO | WO97/24723 | 7/1997 |

* cited by examiner

*Primary Examiner*—Wayne Young
*Assistant Examiner*—LaTanya Bibbins
(74) *Attorney, Agent, or Firm*—Dickstein Shapiro LLP

(57) ABSTRACT

An information recording and reproducing apparatus, a disc apparatus and a defect area replacement method are disclosed for accurately detecting a defect area for each small area of a recording area of an information recording medium and replacing the defect area per small area. The information recording and reproducing apparatus for recording and reproducing information in an information recording medium having a plurality of recording areas each of which includes a plurality of small areas includes a verification execution part iteratively executing a verification operation on small areas of a recording area and a small area replacement part replacing a small area determined as a defect area greater than or equal to a predefined number of times during iterative execution of the verification operation by the verification execution part.

8 Claims, 11 Drawing Sheets

| SA1 | DA1 | SA2 | DA2 | SA3 | DA3 |

FIG.3

| BYTE m | BYTE m+1 | BYTE m+2 | BYTE m+3 | | BYTE m+4 | BYTE m+5 |
|---|---|---|---|---|---|---|
| BIT 7-4 | BIT 3-0 | BIT 7-0 | BIT 7-0 | BIT 7-4 | BIT 3-0 | BIT 7-0 | BIT 7-0 |
| STATUS 1 | SOURCE ADDRESS (DEFECT BLOCK NUMBER) | | | STATUS 2 | DESTINATION ADDRESS (DESTINATION BLOCK NUMBER) | | |

INFORMATION RECORDING AND REPRODUCING APPARATUS, DISC APPARATUS AND DEFECT AREA REPLACEMENT METHOD

BACKGROUND OF THE INVENTION

1. Field of the Invention

The present invention generally relates to an information recording and reproducing apparatus, a disc apparatus and a defect area replacement method, and more particularly to an information recording and reproducing apparatus, such as a hard disk apparatus, a magneto optical disc apparatus, a CD-RW (Compact Disc-Rewritable) disc apparatus, a DVD+RW (Digital Versatile Disc+ReWritable) disc apparatus, DVD-RW (Digital Versatile Disc-ReWritable) disc apparatus and a DVD-RAM (Digital Versatile Disc-Random Access Memory) disc apparatus, that can record and reproduce information in an information recording medium such as a hard disk, a magneto optical disc, a CD-RW disc, a DVD+RW disc, a DVD-RW disc and a DVD-RAM disc, respectively.

2. Description of the Related Art

Currently, a format commonly available for CD-RW discs is being standardized. The standardized format is called "CD-MRW (Compact Disc-Mount Rainier ReWritable)". In CD-MRW, a CD-RW disc is divided into a plurality of recording areas, which are referred to as "packets", and a spare area is provided to each recording area. In each recording area, an area where information (user data) are written is referred to as a "data area (DA)", and an area where a data area is replaced is referred to as a "spare area (SA)". In general, a data area is formed of 138 packets, and a spare area is formed of 8 packets.

If some trouble is detected for a data area, for example, if the address thereof or data therein cannot be read due to flaws, stains, fingerprints and the like, a spare area is used as a replacement destination area for recording the data again. Such a problematic data area is referred to as a "defect area". Data are always written per packet in a data area and a spare area. Accordingly, if an error is detected for a data area, it is possible to read and write user data at a high speed by replacing of the defect area per packet. In conventional information recording and reproducing apparatuses, if an error occurs in a packet, the packet is written immediately after the error detection, as disclosed in Japanese Laid-Open Patent Application 11-501760.

In conventional information recording and reproducing apparatuses, however, even if an insignificant defect is detected in a packet, an area corresponding to the whole packet is used, resulting in wasteful use of capacity of the information recording medium. In general, one packet in a CD-MRW disc is composed of 32 small areas (blocks). As a result, when the whole packet is replaced for such an insignificant defect (for example, even if the defect is limited within one block), it is necessary to use spare areas corresponding to 32 blocks. Thus, available spare areas are exhausted instantly.

If a defect area is replaced per block rather than packet, a spare area would be saved. For replacing per block, however, it is necessary to accurately detect a defect per block. If the defect detection accuracy is insufficient, a data portion that could be read at defect detection time cannot be read after the replacement operation.

SUMMARY OF THE INVENTION

It is a general object of the present invention to provide an information recording and reproducing apparatus, a disc apparatus and a defect area replacement method in which one or more of the above-mentioned problems are eliminated.

A more specific object of the present invention is to provide an information recording and reproducing apparatus, a disc apparatus and a defect area replacement method that, for an information recording medium having a plurality of recording areas each of which includes a plurality of small areas, can detect a defect per small area with high accuracy and replace the defect per small area.

In order to achieve the above-mentioned objects, there is provided according to one aspect of the present invention an information recording and reproducing apparatus for recording and reproducing information in an information recording medium having a plurality of recording areas each of which includes a plurality of small areas, including: a verification execution part iteratively executing a verification operation on small areas of a recording area; and a small area replacement part replacing a small area determined as a defect area greater than or equal to a predefined number of times during iterative execution of the verification operation by the verification execution part.

In an embodiment of the present invention, the information recording and reproducing apparatus may further include: a rotation adjustment part changing at least one of a rotation speed of the information recording medium and a rotation manner for recording and reproducing information in the information recording medium during iterative execution of the verification operation by the verification execution part.

In an embodiment of the present invention, the information recording and reproducing apparatus may further include: an adjacent small area replacement part replacing a small area determined as a defect area greater than or equal to a predefined number of times during iterative execution of the verification operation by the verification execution part together with a predefined number of small areas adjacent to the small area determined as a defect area.

In an embodiment of the present invention, the information recording and reproducing apparatus may further include: an entire small area replacement part, when the number of small areas determined as defect areas greater than or equal to a predefined number of times during iterative execution of the verification operation by the verification execution part is greater than or equal to a predefined value, replacing all small areas of the recording area.

Additionally, there is provided according to another aspect of the present invention a disc apparatus for allocating a spare area of a disc having at least one user data recording area including a plurality of recording areas each of which includes a plurality small areas and at least one spare area to replace a defect area in the user data recording area, including: a verification execution part iteratively executing a verification operation on small areas of a recording area; a defect detection count part counting how many times an error is detected for each small area of the recording area during iterative execution of the verification operation by the verification execution part; and a spare area allocation part, when the number of error detection times counted for a small area by the defect detection count part is greater than or equal to a predefined value, allocating an available one of the at least one spare area to the small area.

Additionally, there is provided according to another aspect of the present invention a defect area replacement method of allocating a spare area of a disc having at least one user data recording area including a plurality of recording areas each of which includes a plurality small areas and at least one spare area to replace a defect area in the user data recording area, the method including the steps of: iteratively executing a verification operation on small areas of a recording area; counting how many times an error is detected for each small area of the recording area during iterative execution of the verification operation; and allocating, when the number of error detection times counted for a small area is greater than or equal to a predefined value, an available one of the at least one spare area to the small area.

According to one aspect of the present invention, it is possible to accurately detect a defect area for each of a plurality of small areas of each of a plurality of recording areas of an information recording medium and replace the defect area per small area.

Furthermore, a program to implement an embodiment of the present invention and a computer readable recording medium for storing the program are disclosed.

Other objects, features and advantages of the present invention will become more apparent from the following detailed description when read in conjunction with the accompanying drawings.

BRIEF DESCRIPTION OF THE DRAWINGS

FIG. 3 shows an exemplary format of replacement information (entries) in a management area of an information recording medium according to one embodiment of the present invention;

DETAILED DESCRIPTION OF THE PREFERRED EMBODIMENTS

In the following, embodiments of the present invention will be described with reference to the accompanying drawings.

An information recording and reproducing apparatus to replace a defect area by reading and writing data per packet from/in a rewritable information recording medium according to one embodiment of the present invention is described.

Figure 1:
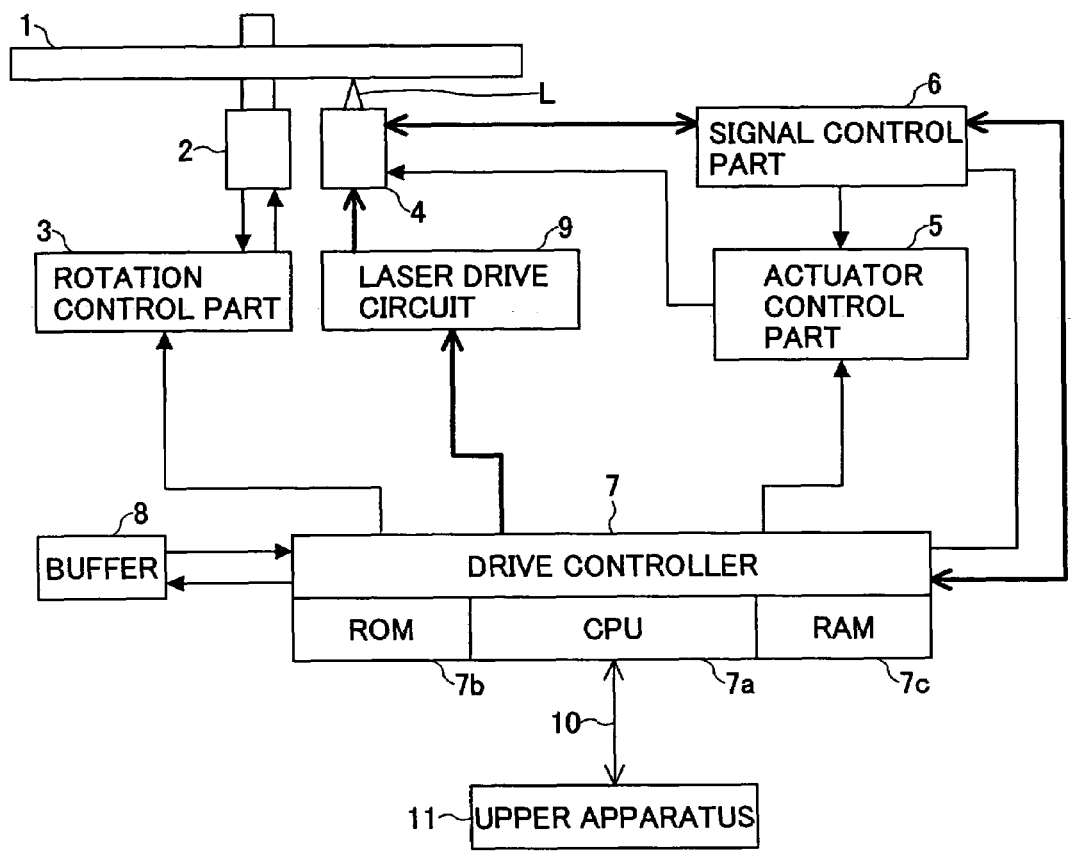
FIG. 1 is a block diagram of an exemplary structure of an information recording and reproducing apparatus according to one embodiment of the present invention.

FIG. 1 is a block diagram of an exemplary structure of an information recording and reproducing apparatus according to one embodiment of the present invention.

The information recording and reproducing apparatus records and reproduces information in an information recording medium. In such an information recording medium, a plurality of recording areas called "packets" are provided. Furthermore, each recording area includes a plurality of small areas called "blocks". The information recording and reproducing apparatus can be implemented, although not limited to the following apparatuses, for example, as a hard disk apparatus, a magneto optical disc apparatus, a CD-RW disc apparatus, a DVD+RW disc apparatus, a DVD-RW disc apparatus and a DVD-RAM disc apparatus that can handle a hard disk, a magneto optical disc, a CD-RW disc, a DVD+RW disc, a DVD-RW disc and a DVD-RAM disc, respectively.

Referring to FIG. 1, an information recording medium 1 may be a disc medium such as a magneto optical disc, a CD-RW disc, a DVD+RW disc, a DVD-RW disc and a DVD-RAM disc. A spindle motor 2 rotates the information recording medium 1 at a predefined rotation speed in accordance with a predefined rotation manner. A rotation control part 3 controls operations of the spindle motor 2. An optical pickup 4 radiates a laser ray L from a semiconductor laser illuminant thereof so as to record and reproduce data in the information recording medium 1. An actuator control part 5 controls horizontal and vertical shifting of the optical pickup 4 with respect to the information recording medium 1. A signal control part 6 transmits reproduction signals to a drive controller 7 based on signals received from the optical pickup 4, and, in turn, transmits recording signals to the optical pickup 4 based on signals received from the drive controller 7.

The drive controller 7 is implemented by a microcomputer configured from CPU (Central Processing Unit) 7a, ROM (Read Only Memory) 7b, RAM (Random Access Memory) 7c and so on. The drive controller 7 not only entirely controls the information recording and reproducing apparatus but also performs various control operations according to the present invention. Specifically, CPU 7a executes various control operations in accordance with control programs stored in ROM 7b. In addition, CPU 7a acquires address information, such as the absolute time and addresses, recorded in the optical disc 1 at fabrication time thereof and address information recorded in the subcode and the header of user data. Such address information is detected by the optical pickup 4. Also, CPU 7a can identify a data block based on the obtained address information.

A buffer 8 is used by the drive controller 7 as a storage area for temporarily storing data. A laser drive circuit 9 controls the laser ray L emitted from the optical pickup 4 in accordance with control of the drive controller 7. An external interface 10 is used to communicate commands and data to an upper apparatus 11 such as a personal computer. The upper apparatus 11 is implemented by a microcomputer configured from CPU, ROM, RAM and so on. The upper apparatus 11 is a host computer (terminal) to control the information recording and reproducing apparatus, such as a personal computer.

In this embodiment, the drive controller 7 (mainly CPU 7a) records and reproduces information in an information recording medium including a plurality of recording areas each of which has a plurality of small areas. The drive controller 7 iteratively verifies the individual small areas, and replaces a small area determined as a defect area greater than or equal to predefined times during the iterative verification.

In addition, the drive controller 7 changes the rotation speed or the rotation manner of the information recording medium 1 during execution of the iterative verification.

If a small area is determined as a defect area above predefined times during the iterative verification, the drive controller 7 may replace not only the detected defect area but also a predefined number of areas adjacent to the defect area.

In addition, if the number of detected small areas in a recording area is greater than or equal to a predefined value, the drive controller 7 may replace all small areas in the recording area.

A format of an information recording medium according to one embodiment of the present invention is described.

Figure 2:
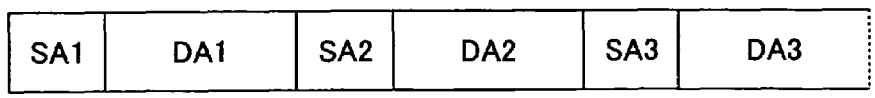
FIG. 2 is a diagram to explain an exemplary format of a CD-MRW disc according to one embodiment of the present invention.

FIG. 2 is a diagram to explain an exemplary format of a CD-MRW disc as an information recording medium according to one embodiment of the present invention.

Referring to FIG. 2, the CD-MRW disc is divided into a plurality of packets (recording areas). Each packet is further divided into a plurality of blocks (small areas). For example, each packet may be formed of 32 blocks. Also, each-block may be comprised of 2,048 bytes. As shown in FIG. 2, data areas (DAs) for writing information (user data) and spare areas (SAs) for recording the user data again for defected DAs are alternately arranged in a program area of the optical disk 1.

In addition to the program area, the optical disk 1 includes a lead-in area and a lead-out area for storing various kinds of management information in general. Normally, if an error block in a data area is replaced with a spare area, the spare area located immediately before the defect data area is used. For example, a defect block "source area" in DA1 is replaced with a "destination area" in SA1. As mentioned above, since the destination area is disposed before the source area, the destination area is "certified" and "verified" as format operations before the source area.

The "certification" is an operation to register error information on defect sectors, which was obtained when recorded areas of an information recording medium were examined at fabrication time thereof, in a primary defect list (PDL). By executing the certification operation, it is possible to prevent the defect sectors registered in PDL from being used.

On the other hand, the "verification" is an operation to determine whether data are properly written in recording areas. In the verification operation, information on area positions including errors is registered as replacement information (which is referred to as an "entry") in a management area in the information recording medium in advance, and then the registered defect areas are replaced with spare areas. Severer defect detection requirements are imposed on this verification operation than normal reproduction operations, for example, by decreasing the number of error correction times or imposing severer block error rates (BLERs). Also, the verification operation may be executed on recording areas not only during a format operation but also a recording operation of user data.

FIG. 3 shows an exemplary format of replacement information (entries) in a management area of the information recording medium 1.

Referring to FIG. 3, the illustrated table is recorded in a main table area (MTA) in a lead-in area and a secondary table area (STA) adjacent to a lead-out area in a program area of the information recording medium 1. Prior to recoding or reproducing of user data by the information recording and reproducing apparatus, the table information is read by CPU 7a and is stored in RAM 7c. CPU 7a controls the rotation control part 3, the optical pickup 4, the laser drive circuit 9 and other components to execute this operation in accordance with programs in ROM 7b.

In the illustrated table, the status 1 indicates "entry replaced", "destination area: available" or "destination area: unavailable". For example, a code "0000" or "0001" is entered in the status 1 to indicate "entry replaced". A code "0010" is entered in the status 1 to indicate "destination area: available". A code "0011" is entered in the status 1 to indicate "destination area: unavailable". If the status 1 indicates "destination area: available" or "destination area: unavailable", that is, "0010" or "0011" is entered in the status 1, the address in question is set as the address of the destination area (destination block number). In this case, the address of the source area (defect block number) is not in use. Here, it is noted that each destination block number is provided in advance.

The status 2 indicates whether data are written in a destination area. For example, if the data are written in the destination area (the status 1 is "0000" in this case), a code "00xx" is entered in the status 2. On the other hand, if the data are not written in the destination area (the status 1 is "0001" in this case), a code "00x0" is entered in the status 2. If the destination area is allocated but the data are not written in the destination area (the status 1 and the status 2 are "0001" and "00x0", respectively, in this case), the data are forced to be read from the source area. Also, if the status 1 indicates "destination area: available" or "destination area: unavailable", that is, if the code "0010" or "0011" is entered in the status 1, a code "0000" is entered in the status 2.

A verification operation of the information recording and reproducing apparatus according to a first embodiment of the present invention is described.

Figure 4:
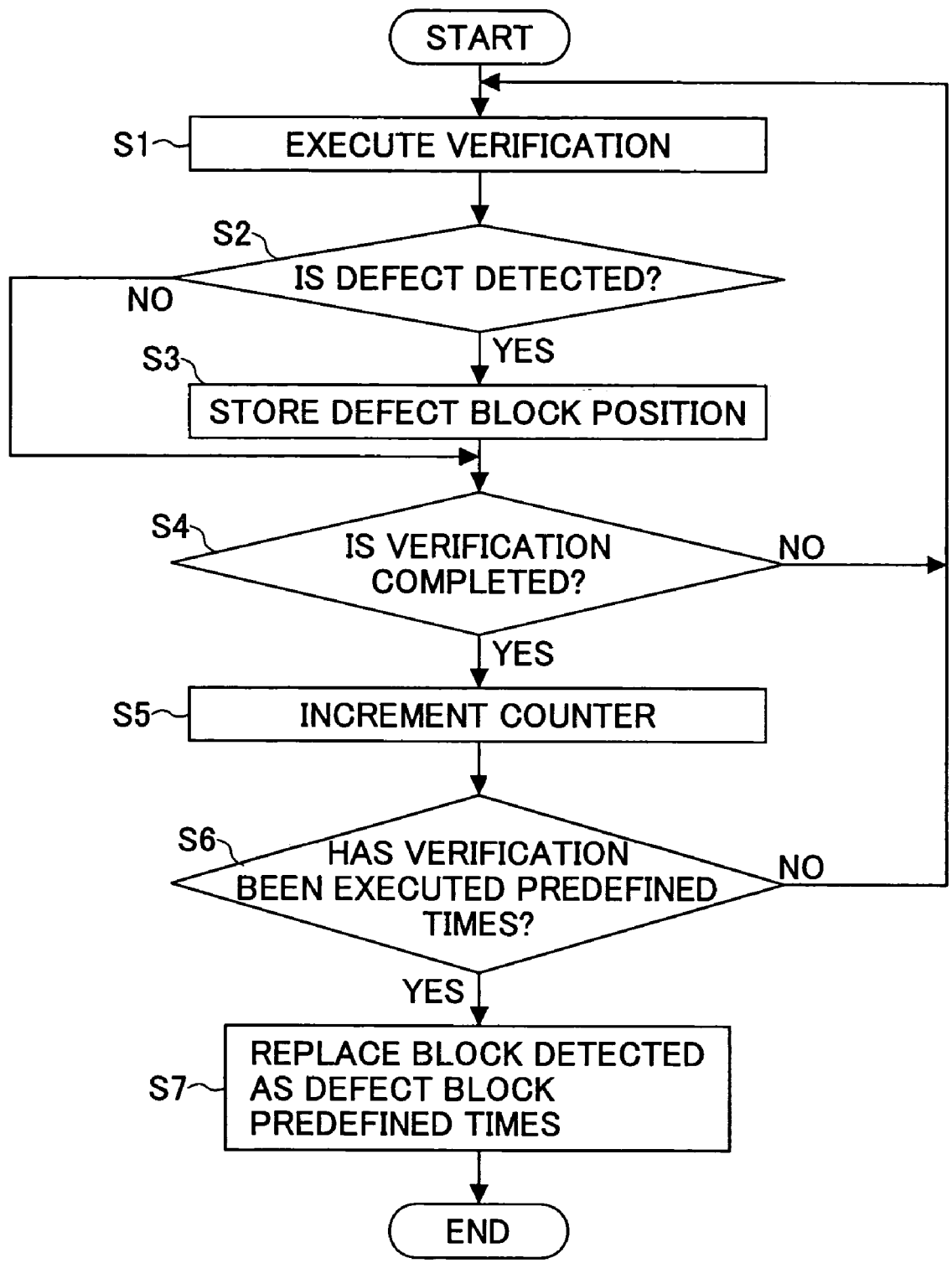
FIG. 4 is a flowchart of an exemplary verification operation on a packet according to a first embodiment of the present invention.

FIG. 4 is a flowchart of an exemplary verification operation on a packet according to the first embodiment. In this embodiment, CPU 7a controls components of the information recording and reproducing apparatus to execute this verification operation in accordance with a control program in ROM 7b. Also, the drive controller 7 (CPU 7a) reads replacement information (management table) from MTA or STA and stores the replacement information in RAM 7c in advance.

Referring to FIG. 4, the CPU 7a sets a predefined number of verification execution times and a predefined number of replacement determination times prior to execution of the verification operation on a packet (recording area) in DA, and executes the verification operation on individual blocks (small areas) in the packet at step S1. Here, the number of replacement determination times is a threshold for triggering a replacement operation.

Specifically, the drive controller 7 controls the rotation control part 3, the actuator control part 5, the laser drive circuit 9 and other components to shift an optical spot emitted from the optical pickup 4 toward the start position of the first block in the packet based on address information recorded in the optical disk 1 (address information recorded in the subcode or the header or address information recorded in advance at disk fabrication time). Then, the block is read, and the verification operation is executed on the block.

At step S2, the CPU 7a determines whether an error occurs in the block, that is, whether the block is a defect area. Here, such an error occurs in any one of the following cases:

case 1. a seek error occurs;
case 2. a tracking servo is out of focus;
case 3 an error cannot be corrected; and
case 4. an error rate is above a predefined value.

In this embodiment, a known error detection method is used to detect errors. If the CPU 7a determines that no error occurs in the block (S2: N), the process control proceeds to step S4. On the other hand, if the CPU 7a determines that an error occurs in the block (S2: Y), the process control proceeds to step S3.

At step S3, CPU 7a stores the position of the detected defect block ("defect position" or "defect address") and the number of error occurrence times counted for the block, for example, in a memory used as a working area in the drive controller 7 such as RAM 7c, and then the process control proceeds to step S4. The defect block is detected by obtaining the address information, which is recorded at the time of or immediately before error occurrence, in the subcode or the header of the user data or the address information recorded in advance at disk fabrication time and performing some operation on the obtained address information. Alternatively, the defect block may be detected by counting the block number during the reading of the packet.

At step S4, the CPU 7a determines whether all blocks in the packet have been verified. In other words, the CPU 7a determines whether the verification operation has been completed on the first through the last block positions of the packet. If the verification operation has not been completed, the process control returns back to step S1 and then steps S1 through S4 are repeated. On the other hand, if all the blocks in the packet have been verified, the CPU 7a increments a counter for the packet by +1 at step S5.

At step S6, the CPU 7a determines whether the verification operation has been executed on the packet predefined times by comparing the preset number of verification execution times to the current counter value. If the verification operation has not been completed the predefined times, the process control returns back to step S1 and then steps S1 through S6 are repeated. On the other hand, if the CPU 7a determines that the verification operation has been executed the predefined times, the process control proceeds to step S7.

At step S7, the CPU 7a replaces defect blocks in which errors have occurred greater than or equal to the predefined times during the iterative verification operation. Specifically, for each block in the packet, the CPU 7a compares the number of error occurrence times for the block to the preset number of replacement determination times. Then, if the CPU 7a detects a block for which the number of error occurrence times is greater than or equal to the number of replacement determination times, the CPU 7a allocates a spare area to the detected block, that is, only the detect block is replaced with the spare area, and terminates the verification operation. In this case, the CPU 7a changes "0001" in the status 1 corresponding to the destination block, and enters the defect block number to the entry. Then, the CPU 7a records updated replacement information in MTA and STA.

In this fashion, the verification operation is iteratively executed per packet. Then, if a defect block that cannot be successfully read greater than or equal to predefined times is detected in a packet, the defect block is registered and then a spare area is allocated to the registered defect block.

Figure 5:
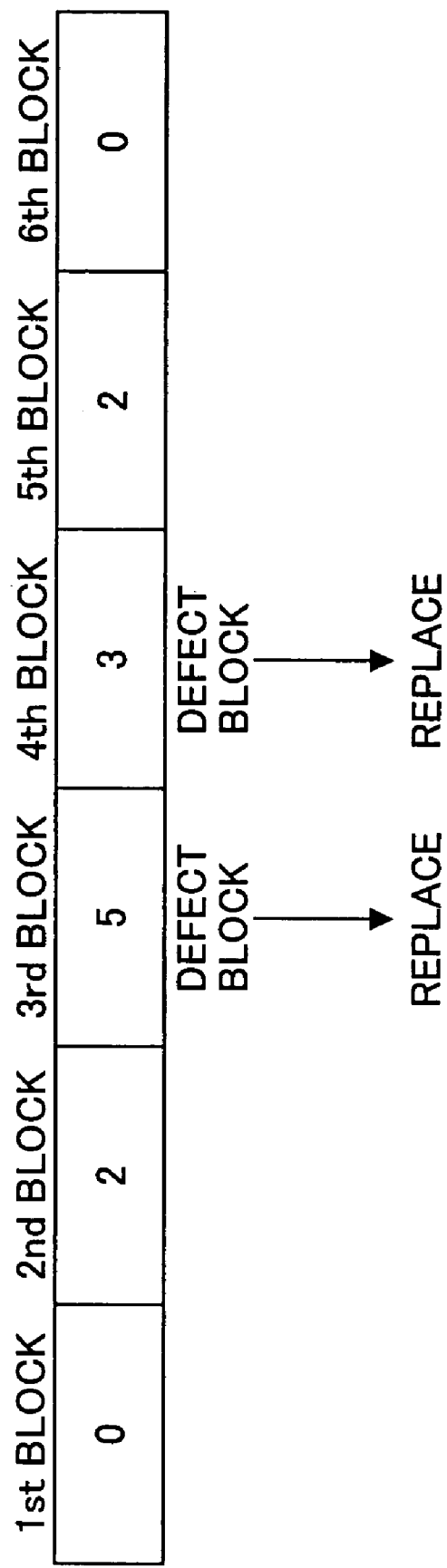
FIG. 5 is a diagram to explain exemplary block positions to be replaced through the verification operation shown in FIG. 4.

FIG. 5 is a diagram to explain exemplary block positions to be replaced through the verification operation shown in FIG. 4. For simplicity, one packet is composed of six blocks in FIG. 5. However, in fact, one packet is composed of 32 blocks in CD-MRW standard. For example, if a block in which errors occur greater than or equal to three times should be replaced, the number of replacement determination times is set as 3. In FIG. 5, the detected numbers of error occurrence times are presented in the interiors of the respective blocks. As shown in FIG. 5, the third and fourth blocks are determined as defect blocks. As a result, the third and fourth blocks are replaced with spare areas, because the third and fourth blocks have the numbers of error occurrence times of 5 and 3, respectively.

For the purpose of a detailed description of the replacement operation according to this embodiment, the third block is focused. Now, it is assumed that the verified packet is in DA2. For the third block, a spare block having the status 1 of "0010" is selected from SA2 corresponding to the destination block number with reference to replacement information. Then, the status 1 is changed into "0001", and the defect block number is entered as the entry of the third block. The similar operation is also performed on the fourth block.

As mentioned above, since a defect block is detected through iterative verification for each block in one packet, it is possible to improve the defect detection accuracy. As a result, it is possible to perform more reliable replacement operations per block and prevent excessive use of spare areas.

Meanwhile, a defect may have variable impact depending on the rotation speed of an information recording medium. In particular, if the rotation speed is not high, there is a risk that blocks located behind a defect block cannot be read. In this case, when a defect block is encountered after seeking and before reading of a target position, an error (such as out of track or focus) occurs, resulting in reading failure. In order to eliminate the problem, the rotation speed or the rotation manner of an information recording medium are changed during packet verification. As such rotation manners, constant angular velocity (CAV) and constant linear velocity (CLV) are typical.

In CAV, data are read at a constant rotation speed. Thus, an optical pickup scans a recorded surface of an information recording medium at a higher (linear) speed in an inner circumferential area whereas the optical pickup does at a lower (linear) speed in an outer circumferential area, because the circumference is larger in the outer circumferential area than in the inner circumferential area. As a result, data are read at variable speeds depending on locations that the optical pickup is reading.

On the other hand, in CLV, data are read at variable rotation speeds so that an optical pickup can read the data at a constant linear speed. In this case, since the circumference of an information recording medium is larger in outer circumferential areas, the optical pickup can obtain more data during reading of outer circumferential areas than inner circumferential areas.

A verification operation of the information recording and reproducing apparatus according to a second embodiment of the present invention is described.

Figure 6:
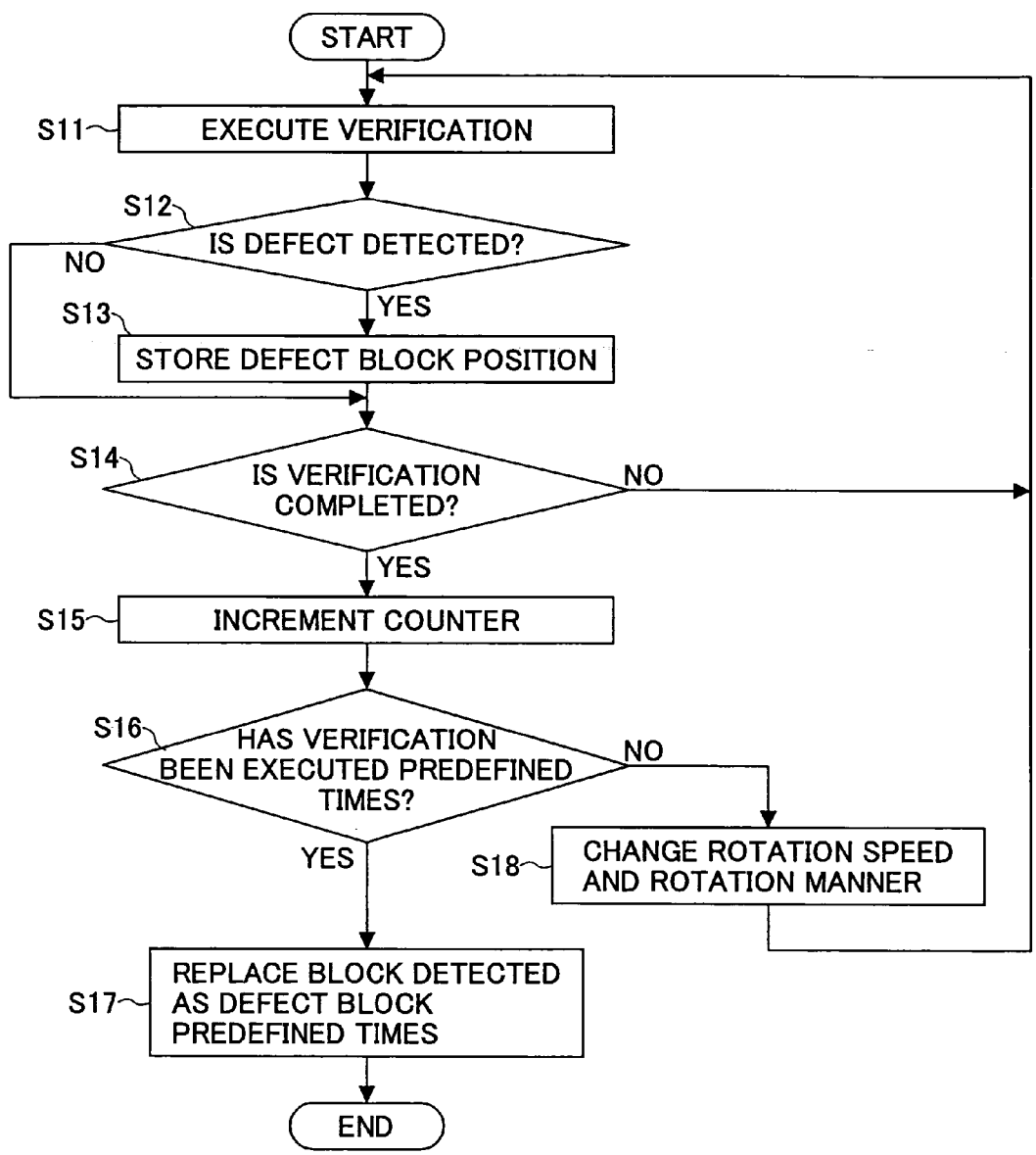
FIG. 6 is a flowchart of an exemplary verification operation on a packet according to a second embodiment of the present invention.

FIG. 6 is a flowchart of an exemplary verification operation on a packet according to the second embodiment. In this embodiment, CPU 7a executes the verification operation by controlling components of the information recording and reproducing apparatus in accordance with control programs in ROM 7b.

Referring to FIG. 6, the CPU 7a sets a predefined number of verification execution times and a predefined number of replacement determination times prior to execution of the verification operation, and then executes the verification operation on blocks in a packet at step S11.

At step S12, the CPU 7a determines whether an error occurs in a block, that is, whether the block is a defect block.

If the CPU 7a determines that no error occurs in the block (S12: N), the process control proceeds to step S14. On the other hand, if the CPU 7a determines that an error occurs in the packet (S12: Y), the CPU 7a stores the defect block position and the number of error occurrence times for the block, for example, in a memory used as a working area in the drive controller 7 at step S13, and then the process control proceeds to step S14.

At step S14, the CPU 7a determines whether all blocks in the packet have been verified. If the CPU 7a determines that some blocks have not been verified, the process control returns to step S11 and then steps S11 through S14 are repeated. On the other hand, if the CPU 7a determines that all the blocks have been verified, the CPU 7a increments a counter counted for the packet by +1 at step S15.

At step S16, the CPU 7a determines whether the verification operation has been executed predefined times by comparing the counter value to the preset number of verification execution times. If the verification operation has not been executed the predefined times (S16: N), the CPU 7a changes the rotation speed or the rotation manner of the information recording medium 1 at step S18 and then the process control returns to step S11. Then steps S11 through S16 and S18 are repeated under various conditions on the rotation speed or the rotation manner. For example, it may be successful to change the rotation speed (for example, 40-speed→32-speed→16-speed), whenever the packet has been verified once (or predefined times). Alternatively, after the verification operation is executed on the packet predefined times, the rotation manner may be alternated between CLV and CAV. Alternatively, various combinations of the rotation speed and the rotation manner may be attempted.

On the other hand, if the verification operation has been executed predefined times (S16: Y), the CPU 7a replaces a block in which errors occurred predefined times. Specifically, the CPU 7a compares the number of the error occurrence times to the predefined number of replacement determination times for each block in the packet. Then, the CPU 7a replaces only blocks in which the number of error occurrence times is greater than or equal to the number of replacement determination times, and then terminates the verification operation.

In the second embodiment, if the verification operation has not been executed predefined times at step S16, CPU 7a performs the same operation in steps S11 through S17 in FIG. 6 as in steps S1 through S7 in FIG. 4 except for variable conditions on the rotation speed and the rotation manner of the spindle motor 2.

In this fashion, the verification operation is iteratively executed under various conditions on rotation speeds and rotation manners. Then, only a block that cannot be successfully read greater than or equal to predefined times is registered as a defect block, and the registered defect block is replaced. As a result, it is possible to perform more reliable replacement operations by reducing variations of defect detection accuracy due to rotation during reading.

Meanwhile, there is a risk that a block cannot be read due to different rotation speeds and rotation manners of information recording and reproducing apparatuses produced by various manufactures. Furthermore, there is risk that a non-defect block cannot be read depending on degrees of defect. In this case, it may be successful that a block determined as a defect block relatively many times, which is referred to as a "serious defect block", is replaced together with a predefined number of blocks adjacent to the serious defect block.

A verification operation of the information recording and reproducing apparatus according to a third embodiment of the present invention is described.

Figure 7:
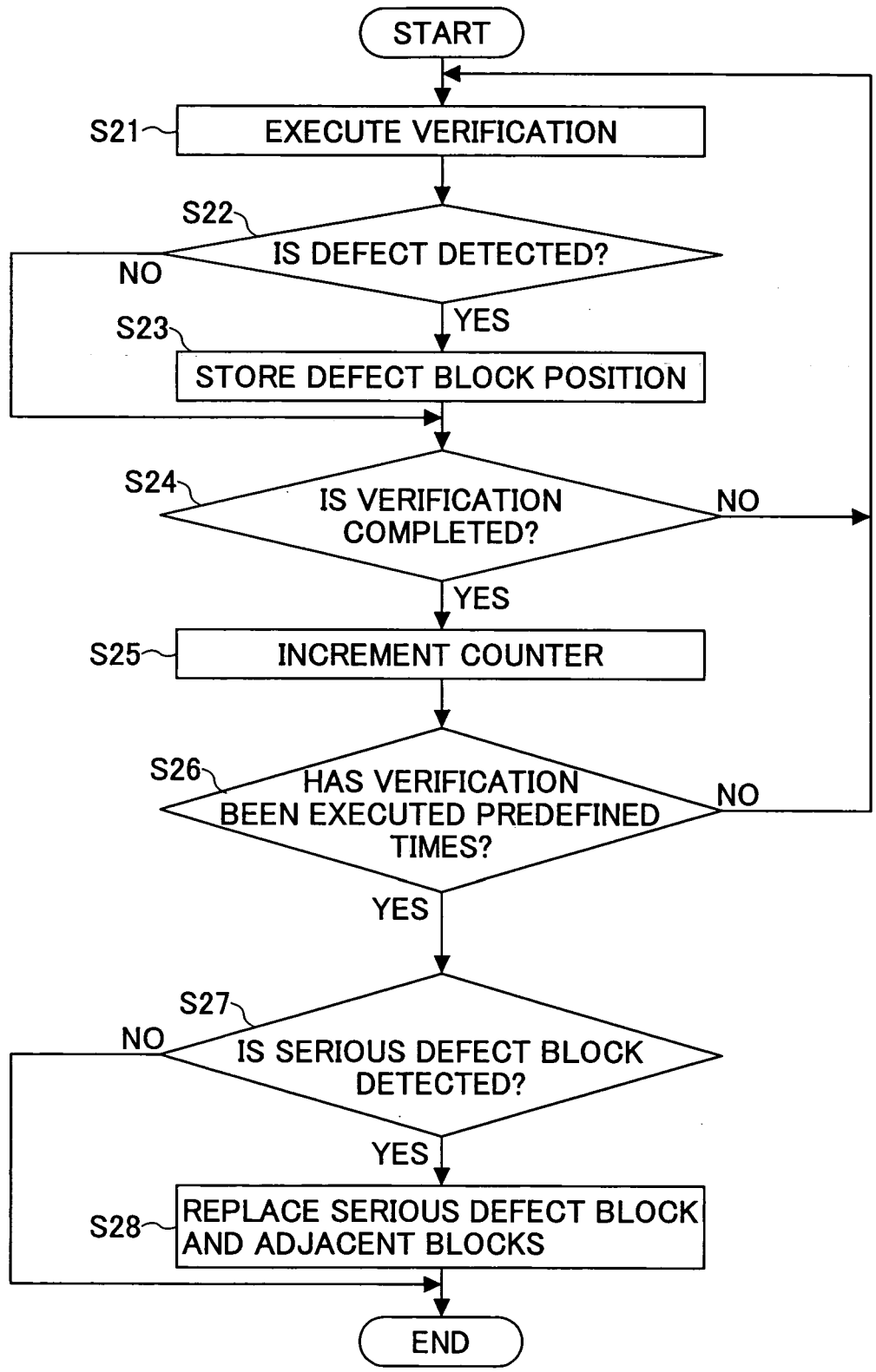
FIG. 7 is a flowchart of an exemplary verification operation on a packet according to a third embodiment of the present invention.

FIG. 7 is a flowchart of an exemplary verification operation on a packet according to the third embodiment. In this embodiment, CPU 7a executes the verification operation by controlling components of the information recording and reproducing apparatus in accordance with control programs in ROM 7b.

Referring to FIG. 7, the CPU 7a sets a predefined number of verification execution times and a predefined number of adjacent block replacement determination times prior to execution of the verification operation, and executes the verification operation on blocks in a packet at step S21. Here, the number of adjacent block replacement determination times is a value for triggering execution of an adjacent block replacement operation to replace a serious defect block together with a predefined number of blocks adjacent to the serious defect block.

At step S22, the CPU 7a determines whether an error occurs in a block, that is, whether the block is a defect block.

If the CPU 7a determines that no error occurs in the block (S22: N), the process control proceeds to step S24. On the other hand, if the CPU 7a determines that an error is detected in the block (S22: Y), the CPU 7a stores the defect block position and the number of error occurrence times for the block, for example, in a memory used as a working area in the drive controller 7 at step S23, and the process control proceeds to step S24.

At step S24, the CPU 7a determines whether all blocks in the packet have been verified. If all the packets have not been verified, the process control returns to step S21 and then steps S21 through S24 are repeated. On the other hand, if all the packets have been verified, the CPU 7a increments a counter counted for the packet by +1 at step S25.

At step S26, the CPU 7a determines whether the verification operation has been executed predefined times by comparing the counter value to the preset number of verification execution times. If the verification operation has not been executed the predefined times (S26: N), the process control returns to step 21 and then steps 21 through 26 are repeated. On the other hand, if the verification operation has been executed the predefined times (S26: Y), CPU 7a determines whether there is a serious defect block that cannot be successfully read greater than or equal to the preset number of adjacent block replacement determination times at step S27.

If no serious defect block is detected (S27: N), the CPU 7a terminates the verification operation.

On the other hand, if such a serious defect block is detected (S26: Y), CPU 7a replaces not only the serious defect block but also a predefined number of blocks adjacent to the serious defect block (for example, two blocks immediately adjacent to the serious defect block), in other words, CPU 7a allocates spare areas to these blocks at step S28.

Furthermore, if the CPU 7a sets, in addition to the number of adjacent block replacement determination times, a predefined number of replacement determination times prior to execution of the verification operation, CPU 7a can determine whether there is a defect block for which the number of error occurrence times is smaller than the number of adjacent block replacement determination times but is greater than or equal to the number of replacement determination times at step S27. It is noted that the number of replacement determination times is usually set as a value smaller than or equal to the number of adjacent block replacement determination times, because the latter threshold is used to determine more serious defect blocks.

From the above description, it can be understood that steps S21 through S26 according to the third embodiment are similar to steps S1 through S6 in FIG. 4 except that the number of adjacent block replacement determination times is used instead of the number of replacement determination times.

In this fashion, the verification operation is iteratively executed per packet, and in particular, if a block cannot be frequently read, for example, if the block cannot be read at all during execution of the verification operation, the serious defect block is replaced together with a predefined number of blocks adjacent to the serious defect block. As a result, it is possible to prevent these adjacent blocks, which may be non-defect blocks in nature, from not being read.

A verification operation of the information recording and reproducing apparatus according to a fourth embodiment of the present invention is described. Basically, the fourth embodiment incorporates the second and third embodiments.

Figure 8:
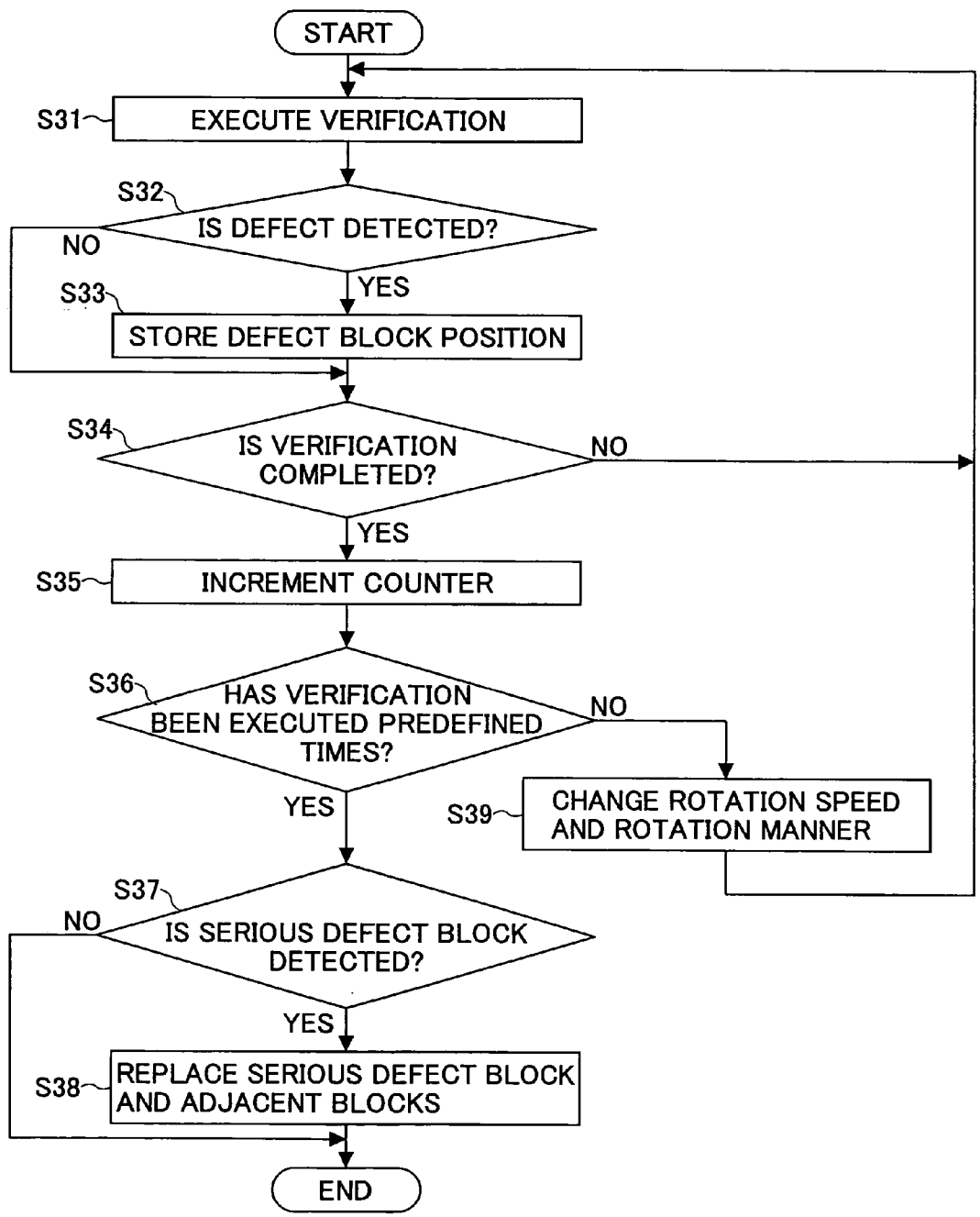
FIG. 8 is a flowchart of an exemplary verification operation on a packet according to a fourth embodiment of the present invention.

FIG. 8 is a flowchart of an exemplary verification operation on a packet according to the fourth embodiment. In this embodiment, CPU 7a executes the verification operation by controlling components of the information recording and reproducing apparatus in accordance with control programs in ROM 7b.

Referring to FIG. 8, the CPU 7a sets a predefined number of verification execution times and a predefined number of adjacent block replacement determination times prior to execution of the verification operation, and executes the verification operation on blocks in a packet at step S31.

At step S32, the CPU 7a determines whether an error occurs in a block, that is, whether the block is a defect block.

If the CPU 7a determines that no error occurs in the block (S32: N), the process control proceeds to step S34. On the other hand, if an error is detected in the block (S32: Y), the CPU 7a stores the defect block position and the number of error occurrence times for the block, for example, in a memory used as a working area in the drive controller 7, at step S33.

At step S34, the CPU 7a determines whether all blocks in the packet have been verified. If all the blocks have not been verified (S34: N), the process control returns to step S31 and then steps S31 through S34 are repeated. On the other hand, if all the blocks have been verified (S34: Y), the CPU 7a increments a counter counted for the packet by +1 at step S35.

At step S36, the CPU 7a determines whether the verification operation has been executed predefined times by comparing the current counter value to the preset number of verification execution times. If the verification operation has not been executed the predefined times (S36: N), the CPU 7a changes the rotation speed or the rotation manner of the information recording medium 1 at step S39. Then, the process control returns to step S31 and steps S31 through S36 are repeated under various conditions on the rotation speed and the rotation manner. For example, whenever the verification operation has been executed on the packet once or predefined times, the rotation speed may be changed. Alternatively, after the verification operation has been executed on the packet predefined times, the rotation manner may be alternated between CLV and CAV. Alternatively, various combinations of rotation speeds and rotation manners may be attempted.

On the other hand, if the verification operation has been executed the predefined times (S36: Y), the CPU 7a determines whether there is a serious defect block that cannot be successfully read greater than or equal to the preset number of adjacent block replacement determination times at step S37.

If no serious defect block is detected in the packet (S37: N), the CPU 7 terminates the verification operation.

On the other hand, if such a serious defect block is detected in the packet (S37: Y), the CPU 7a replaces not only the serious defect block but also a predefined number of blocks adjacent to the serious defect block (for example, two blocks immediately adjacent to the serious defect block), in other words, CPU 7a allocates spare areas to these blocks at step S28.

Furthermore, if the CPU 7a sets, in addition to the number of adjacent block replacement determination times, a predefined number of replacement determination times prior to execution of the verification operation, CPU 7a can determine whether there is a defect block for which the number of error occurrence times is smaller than the number of adjacent block replacement determination times but is greater than or equal to the number of replacement determination times at step S37. In this case, the CPU 7a may replace the defect block together with serious defect block and the adjacent blocks.

From the above description, it can be understood that steps S31 through S38 according to the fourth embodiment are similar to steps S21 through S28 in FIG. 7 and step S39 corresponds to step S18 in FIG. 6.

In this fashion, the verification operation is iteratively executed per packet under various rotation speeds and rotation manners, and in particular, if a block cannot be frequently read, for example, if the block cannot be read at all during execution of the verification operation, the serious defect block is replaced together with a predefined number of blocks adjacent to the serious defect block. As a result, it is possible to suppress variations of defect detection accuracy due to rotation and perform reliable replacement operations. In addition, it is possible to prevent the adjacent blocks, which may be non-defect blocks in nature, from not being read.

Figure 9:
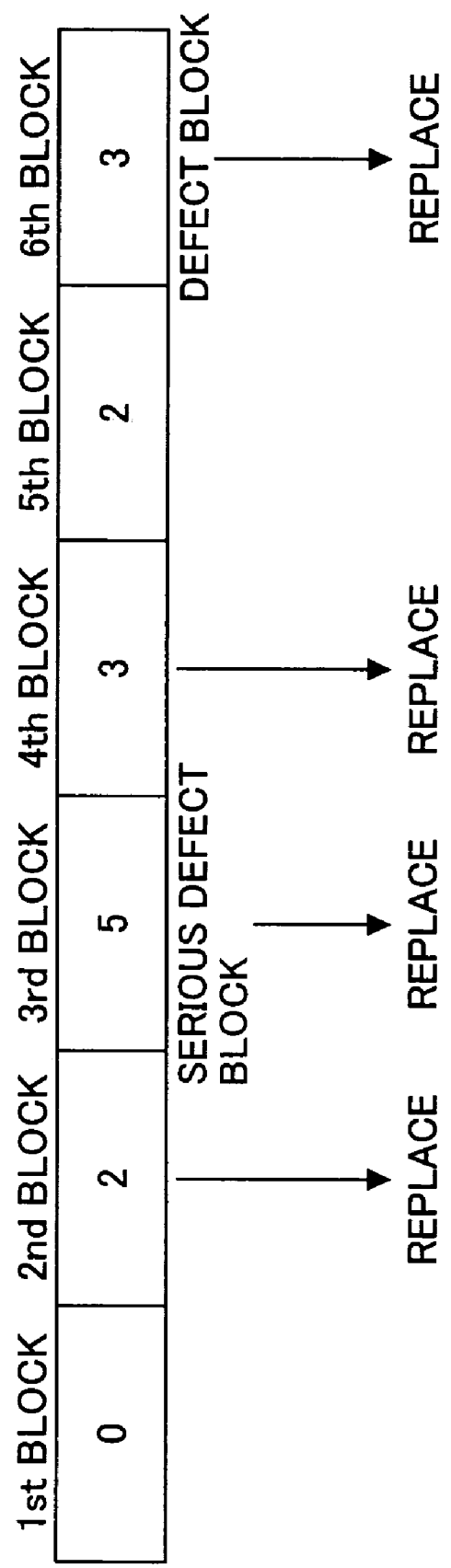
FIG. 9 is a diagram to explain exemplary block positions to be replaced through the verification operation shown in FIG. 7 and FIG. 8.

FIG. 9 is a diagram to explain exemplary block positions to be replaced through the verification operation shown in FIG. 7 and FIG. 8. For simplicity, one packet is composed of six blocks in FIG. 9. However, in fact, one packet is composed of 32 blocks in CD-MRW standard. For example, if a block in which errors occur greater than or equal to five times should be replaced as a serious defect block together with the adjacent blocks, the number of adjacent block replacement determination times is set as 5. Also, if a block in which errors occur greater than or equal to three times should be replaced as a defect block, the number of replacement determination times is set as 3. In FIG. 9, the detected numbers of error occurrence times are presented in the interiors of the respective blocks. As shown in FIG. 9, the third block is determined as a serious defect block, and the second and fourth blocks are determined as the adjacent blocks corresponding to the third block, are replaced with a spare area. In this example. As a result, the serious defect block and the two adjacent blocks, that is, the second through fourth blocks, are replaced. However, although the two blocks immediately adjacent to the serious defect block are replaced in this example, the number of adjacent block replacement determination times may be set in several levels. In other words, the number of replaced blocks may be gradually increased corresponding to the levels of seriousness.

In addition, the sixth block is also replaced, because the number of error occurrence times for the sixth block is equal to the number of replacement determination times.

For the purpose of a detailed description of the replacement operation according to the embodiments, the second block is focused. Now, it is supposed that the verified packet is in DA2. For the second block, a spare block having the status 1 of "0010" is selected from SA2 corresponding to the destination block number with reference to replacement information. Then, the status 1 is changed into "0001", and the defect block number is entered as the entry of the second block. The similar operation is also performed on the third, fourth and sixth blocks.

As mentioned above, since a serious defect block is replaced together with its adjacent blocks, it is possible to maintain readability of blocks adjacent to the serious defect block.

Meanwhile, when many blocks have to be replaced in a packet, it takes a longer time to search for their destinations, resulting in delayed access time. In order to eliminate the problem, if many blocks have to be replaced in a packet, all blocks in the packet may be replaced.

A verification operation of the information recording and reproducing apparatus according to a fifth embodiment of the present invention is described.

Figure 10:
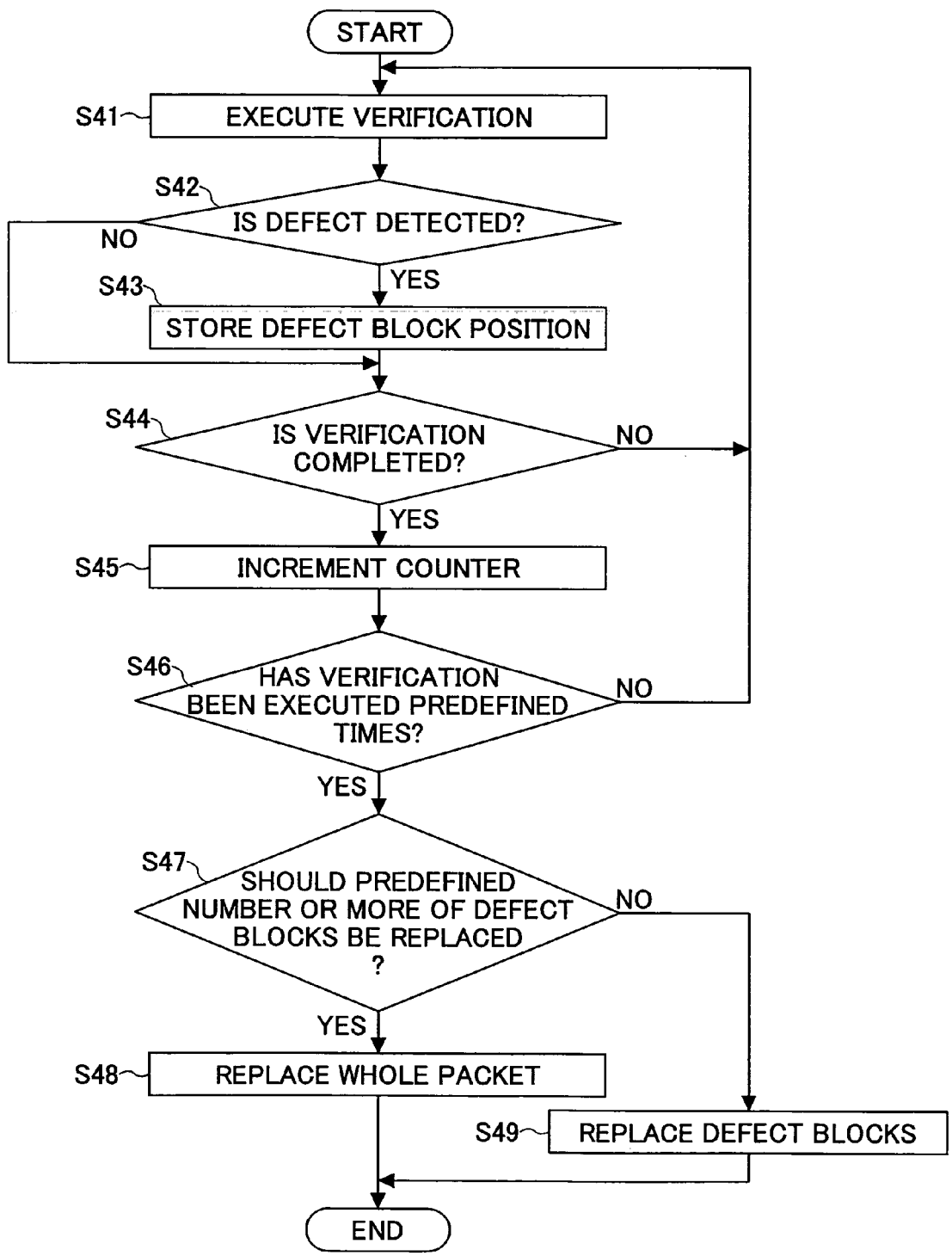
FIG. 10 is a flowchart of an exemplary verification operation on a packet according to a fifth embodiment of the present invention.

FIG. 10 is a flowchart of an exemplary verification operation on a packet according to the fifth embodiment. In this embodiment, CPU 7a executes the verification operation by controlling components of the information recording and reproducing apparatus in accordance with control programs in ROM 7b.

Referring to FIG. 10, the CPU 7a sets a predefined number of verification execution times, a predefined number of replacement determination times and a predefined number of packet replacement determination blocks prior to execution of the verification operation, and then executes the verification operation on individual blocks in a packet at step S41. Here, the number of packet replacement determination blocks is a value for triggering a replacement operation to replace all blocks in a packet.

At step S42, the CPU 7a determines whether an error occurs in a block, that is, whether the block is a defect block.

If no error is detected in the block (S42: N), the process control proceeds to step S44. On the other hand, if an error is detected in the block (S42: Y), the CPU 7a stores the defect block position and the number of error occurrence times for the block, for example, in a memory used as a working area in the drive controller 7, at step S43, and the process control proceeds to step S44.

At step S44, the CPU 7a determines whether all blocks in the packet have been verified. If all the blocks have not been verified (S44: N), the process control returns to step S41 and then steps S41 through S44 are repeated. On the other hand, if all the blocks have been verified (S44: Y), the CPU 7a increments a counter counted for the packet by +1 at step S45.

At step S46, the CPU 7a determines whether the verification operation has been executed predefined times by comparing the current counter value to the preset number of verification execution times.

If the verification operation has not been executed predefined times (S46: N), the process control returns to step S41 and then steps S41 through S46 are repeated. On the other hand, if the verification operation has been executed predefined times (S46: Y), the CPU 7a determines whether the number of defect blocks to be replaced is greater than or equal to the preset number of packet replacement determination blocks at step S47.

Specifically, the CPU 7a counts defect blocks in each of which the number of error occurrence times is greater than or equal to the preset number of replacement determination times. Based on the count result, the CPU 7a determines whether the counted number of defect blocks is greater than or equal to the number of packet replacement determination blocks.

If the number of defect blocks is greater than or equal to the number of packet replacement determination blocks (S47: Y), the CPU 7a replaces all the blocks in the packet at step S48.

On the other hand, if the number of defect blocks is less than the number of packet replacement determination blocks, the CPU 7a replaces only the defect blocks at step S49. Specifically, the CPU 7a compares the number of error occurrence times for each block to the number of replacement determination times. Then, the CPU 7a replaces only the defect blocks in each of which errors have been counted greater than or equal to the number of replacement determination times, and terminates the verification operation.

In this fashion, the verification operation is iteratively executed per packet, and if the number of defect blocks in one packet is greater than or equal to a predefined number of blocks, all blocks in the packet are replaced.

Furthermore, if the CPU 7a sets, in addition to the number of replacement determination times, the above-mentioned number of adjacent block replacement determination times prior to execution of the verification operation, CPU 7a can determine the number of blocks to be replaced, including blocks adjacent to serious defect blocks. Specifically, the CPU 7a determines whether there is a serious defect block for which the number of error occurrence times is greater than or equal to the number of adjacent block replacement determination times. If such a serious defect block is detected in the packet, the CPU 7a counts not only the serious defect block but also blocks adjacent to the serious defect block as the blocks to be replaced. On the other hand, if no serious defect block is detected in the packet, the CPU 7a replaces only defect blocks.

As mentioned above, steps S41 through S46 according to the fifth embodiment are similar to steps S1 through S6 in FIG. 4, steps S11 through S16 in FIG. 6, steps S21 through S26 in FIG. 7 and steps S31 through S36 in FIG. 8 except that the number of packet replacement determination blocks is additionally set prior to the verification operation.

In this fashion, if the number of blocks to be replaced in a packet is greater than or equal to a predefined number of blocks, all blocks in the packet are replaced. As a result, it is possible to prevent delayed access time without search time for destinations of the defect blocks.

A verification operation of the information recording and reproducing apparatus according to a sixth embodiment of the present invention is described.

Figure 11:
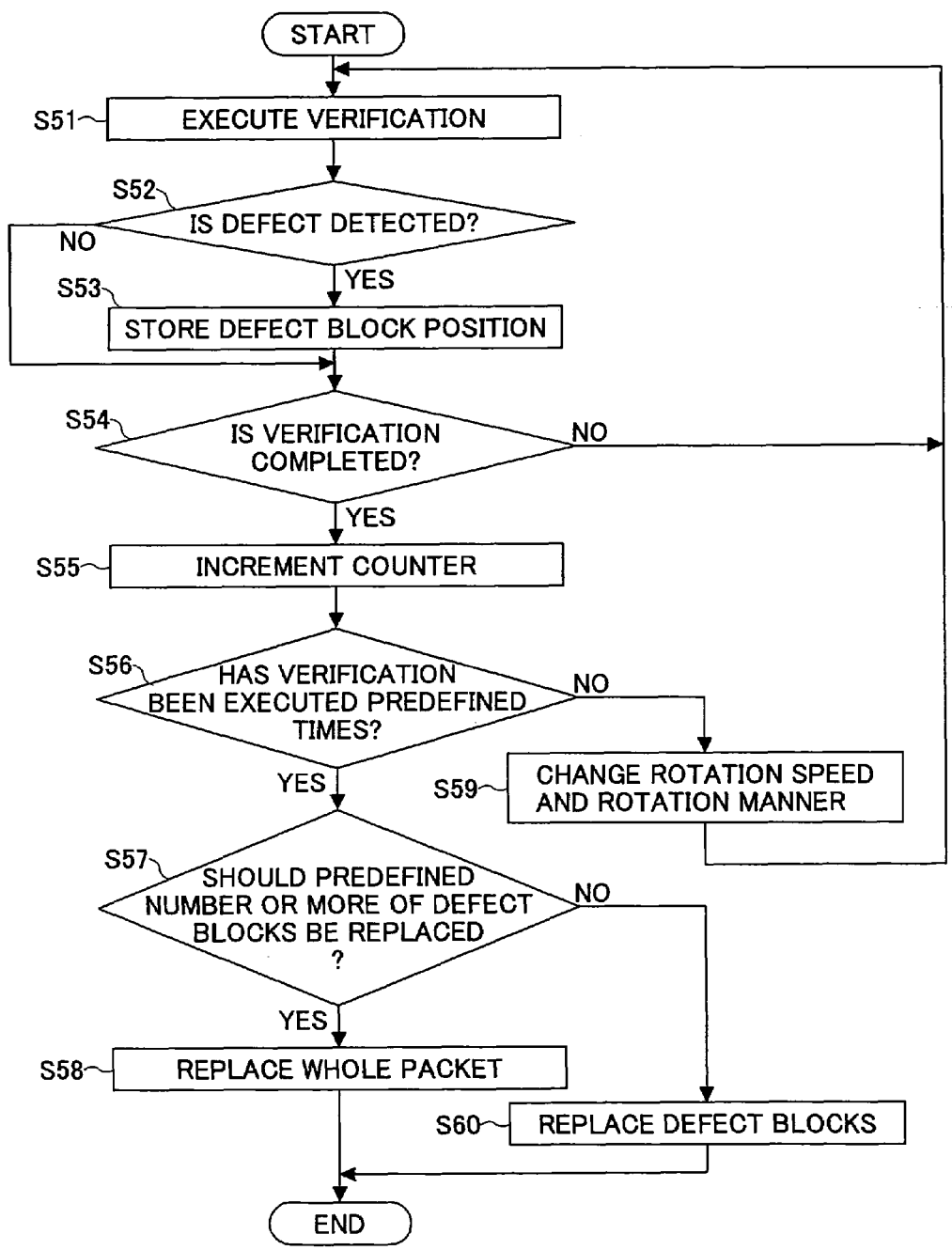
FIG. 11 is a flowchart of an exemplary verification operation on a packet according to a sixth embodiment of the present invention.

FIG. 11 is a flowchart of an exemplary verification operation on a packet according to the sixth embodiment. In this embodiment, CPU 7a executes the verification operation by controlling components of the information recording and reproducing apparatus in accordance with control programs in ROM 7b.

Referring to FIG. 11, the CPU 7a sets a predefined number of verification execution times and a predefined number of adjacent block replacement determination times prior to execution of the verification operation on a packet, and executes the verification operation on individual blocks in the packet at step S51.

At step S52, the CPU 7a determines whether an error occurs in a block, that is, whether the block is a defect block.

If no error occurs in the block (S52: N), the process control proceeds to step S54. On the other hand, if an error occurs in the block (S52: Y), the CPU 7a stores the defect block position and the number of error occurrence times for the block, for example, in a memory used as a working area in the drive controller 7, at step S53, and then the process control proceeds to step S54.

At step S54, the CPU 7a determines whether all blocks in the packet have been verified. If all the blocks have not been verified (S54: N), the process control returns to step S51 and then steps S51 through S54 are repeated. On the other hand, if all the blocks have been verified (S54: Y), the CPU 7a increments a counter counted for the packet by +1 at step S55.

At step S56, the CPU 7a determines whether the verification operation has been executed predefined times by comparing the current counter value to the number of verification execution times.

If the verification operation has not been executed the predefined times (S56: N), the CPU 7a changes the rotation speed or the rotation manner of the information recording medium at step S59. Then, the process control returns to step S51 and steps S51 through S56 are repeated under various conditions on rotation speeds or rotation manners. In step S59, for example, whenever the verification operation is completed on the packet once (or predefined times), the rotation speed may be changed. Alternatively, after the verification operation is executed on the packet predefined times, the rotation manner may be alternated between CLV and CAV. Alternatively, various combination of rotation speeds and rotation manners may be attempted.

On the other hand, if the verification operation has been repeated the predefined times (S56: Y), the CPU 7a determines whether the number of blocks to be replaced is greater than or equal to the preset number of packet replacement determination blocks at step S57.

If the number of defect blocks is determined to be greater than or equal to the number of packet replacement determination blocks (S57: Y), the CPU 7a registers all the blocks in the packet as defect blocks, and replaces the registered blocks at step S58.

On the other hand, if the number of defect blocks is determined to be less than the number of packet replacement determination blocks (S57: N), the CPU 7a replaces only detected defect blocks at step S60. Specifically, the CPU 7a compares the preset number of replacement determination times to the numbers of error occurrence times for each block. Based on the comparison, the CPU 7a replaces only defect blocks in each of which errors have been counted greater than or equal to the number of replacement determination times, and terminates the verification operation.

In this fashion, the verification operation is iteratively executed per packet, and if the number of blocks to be replaced is greater than or equal to the predefined number of packet replacement determination blocks, the CPU 7a replaces all blocks in the packet.

Furthermore, if the CPU 7a sets, in addition to the number of replacement determination times, the above-mentioned number of adjacent block replacement determination times in prior to execution of the verification operation, CPU 7a can determine the number of blocks to be replaced, including blocks adjacent to serious defect blocks. Specifically, the CPU 7a determines whether there is a serious defect block in which errors have been counted greater than or equal to the number of adjacent block replacement determination times. If such a serious defect block is detected in the packet, the CPU 7a counts the detected serious defect blocks and blocks adjacent to the serious defect blocks as blocks to be replaced. On the other hand, if no serious defect block is detected in the packet, the CPU 7a replaces only defect blocks.

From the above description, it can be understood that steps S51 through S58 according to the sixth embodiment correspond to steps S41 through S48 in FIG. 10, and step S60 corresponds to step S49 in FIG. 10. Also, step S59 corresponds to step 18 in FIG. 6 or step S39 in FIG. 8.

As mentioned above, the verification operation is iteratively executed per packet under various conditions on rotation speeds and rotation manners. If a serious defect block is detected in a packet, block positions of the serious defect block and the adjacent blocks are registered as defect blocks, and these blocks are replaced. As a result, it is possible to not only suppress variations of defect detection accuracy but also maintain readability of blocks adjacent to serious defect blocks. In addition, if the number of blocks to be replaced is greater than or equal to a predefined number of blocks, all blocks in the packet are replaced. As a result, it is possible to prevent delayed access time without search for destinations of the defect blocks.

Figure 12:
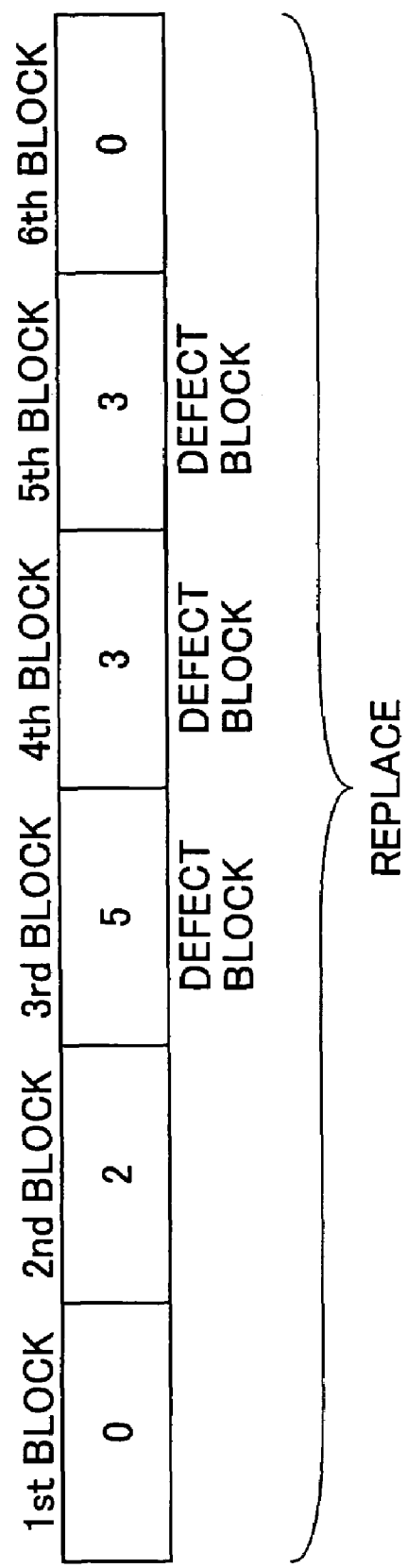
FIG. 12 is a diagram to explain exemplary block positions to be replaced through the verification operation shown in FIG. 10 and FIG. 11.

FIG. 12 is a diagram to explain block positions to be replaced through execution of the verification operation shown in FIG. 10 and FIG. 11. For simplicity, one packet is composed of six blocks in FIG. 12. However, in fact, one packet is composed of 32 blocks in CD-MRW standard. For example, if a block in which errors occur greater than or equal to three times should be replaced, the number of replacement determination times is set as 3. Also, the number of packet replacement determination blocks is set as 3. In FIG. 12, the detected number of error occurrence times are presented in the interiors of the respective blocks. As shown in FIG. 12, in the third through fifth blocks, errors occur greater than or equal to three times. In this example, since the number of packet replacement determination blocks is set as 3 and the three blocks are determined as defect blocks, all blocks of the packet are replaced.

For the purpose of a detailed description of the replacement operation according to the embodiments, the first block is focused. Now, it is supposed that the verified packet is in DA2. For the first block, a spare block having the status 1 of "0010" is selected from SA2 corresponding to the destination block number with reference to replacement information. Then, the status 1 is changed into "0001", and the defect block number is entered as the entry of the first block. The similar operation is also performed on the second through sixth blocks.

As mentioned above, if many blocks should be replaced in a packet, the entire packet is replaced. As a result, it is possible to prevent delayed access time caused by replacing individual blocks separately.

According to the present invention, the information recording and reproducing apparatus can implement all of the above-mentioned embodiments of the verification operations.

The above-mentioned embodiments are focused on the verification operation for format operations. However, the present invention is not limited to such format operations. The present invention can be applied to verification operations involved in recording of user data in an unformatted area. In such a replacement operation, an available destination block, that is, a block having the status 1 of "0010", is allocated, and data in a defect block are replaced with the destination block. Then, the status 1 corresponding to the destination block number is changed into "0000", and the defect block number is entered in an entry.

Also, the above-mentioned embodiments are focused on an information recording and reproducing apparatus that can read/write data from/in a CD-MRW disc. However, the present invention is not limited to such a CD-MRW disc apparatus. The present invention is applicable to other information recording and reproducing apparatuses, such as a hard disk apparatus, a magneto optical disc apparatus, a CD-RW disc apparatus, a DVD+RW disc apparatus, a DVD-RW disc apparatus and a DVD-RAM disc apparatus, that can record and reproduce information in other information recording media having a user data area and a replacement area, such as a hard disk, a magneto optical disc, a CD-RW disc, DVD+RW disc, a DVD-RW disc and a DVD-RAM disc, respectively.

Furthermore, the present invention is applicable to a personal computer such as a desktop personal computer and a notebook personal computer.

The present invention is not limited to the specifically disclosed embodiments, and variations and modifications may be made without departing from the scope of the present invention.

The present application is based on Japanese Patent Priority Applications No. 2003-035955 filed Feb. 14, 2003 and No. 2003-321993 filed Sep. 12, 2003, the entire contents of which are hereby incorporated by reference.

What is claimed is:

1. An information recording and reproducing apparatus for recording and reproducing information in an information recording medium having a plurality of recording areas each of which includes a plurality of small areas, comprising:
    a verification execution part iteratively executing a verification operation on small areas of a recording area;
    a small area replacement part replacing a small area determined as a defect area greater than or equal to a predefined number of times during iterative execution of the verification operation by the verification execution part; and
    a rotation adjustment part changing at least one of a rotation speed of the information recording medium and a rotation manner for recording and reproducing information in the information recording medium during iterative execution of the verification operation by the verification execution part.

2. An information recording and reproducing apparatus for recording and reproducing information in an information recording medium having a plurality of recording areas each of which includes a plurality of small areas, comprising:
    a verification execution part iteratively executing a verification operation on small areas of a recording area;
    a small area replacement part replacing a small area determined as a defect area greater than or equal to a predefined number of times during iterative execution of the verification operation by the verification execution part; and
    an adjacent small area replacement part replacing a small area determined as a defect area greater than or equal to a predefined number of times during iterative execution of the verification operation by the verification execution part together with a predefined number of small areas adjacent to the small area determined as a defect area.

3. A disc apparatus for allocating a spare area of a disc having at least one user data recording area including a plurality of recording areas each of which includes a plurality of small areas and at least one spare area to replace a defect area in the user data recording area, comprising:
    a verification execution part iteratively executing a verification operation on small areas of a recording area;
    a defect detection count part counting how many times an error is detected for each small area of the recording area during iterative execution of the verification operation by the verification execution part;
    a spare area allocation part, when the number of error detection times counted for a small area by the defect detection count part is greater than or equal to a predefined value, allocating an available one of the at least one spare area to the small area; and
    a rotation adjustment part changing at least one of a rotation speed and a rotation manner of the disc whenever the verification operation is executed on the recording area a predefined number of times.

4. The disc apparatus as claimed in claim 3, wherein the predefined number of times is one.

5. A disc apparatus for allocating a spare area of a disc having at least one user data recording area including a plurality of recording areas each of which includes a plurality of small areas and at least one spare area to replace a defect area in the user data recording area, comprising:
    a verification execution part iteratively executing a verification operation on small areas of a recording area;
    a defect detection count part counting how many times an error is detected for each small area of the recording area during iterative execution of the verification operation by the verification execution part; and
    a spare area allocation part, when the number of error detection times counted for a small area by the defect detection count part is greater than or equal to a predefined value, allocating an available one of the at least one spare area to the small area; and
    a spare area to adjacent small area allocation part allocating available ones of the at least one spare area to small areas adjacent to the small area in which the number of error detection times counted for the small area by the defect detection count part is greater than or equal to the predefined value.

6. A defect area replacement method of allocating a spare area of a disc having at least one user data recording area including a plurality of recording areas each of which includes a plurality of small areas and at least one spare area to replace a defect area in the user data recording area, the method comprising the steps of:
    iteratively executing a verification operation on small areas of a recording area;
    counting how many times an error is detected for each small area of the recording area during iterative execution of the verification operation; and
    allocating, when the number of error detection times counted for a small area is greater than or equal to a predefined value, an available one of the at least one spare area to the small area; and wherein the step of iteratively executing the verification operation further comprises the step of: changing at least one of a rotation speed and a rotation manner of the disc whenever the verification operation is executed on the recording area a predefined number of times.

7. The defect area replacement method as claimed in claim 6, wherein the predefined number of times is one.

8. A defect area replacement method of allocating a spare area of a disc having at least one user data recording area including a plurality of recording areas each of which includes a plurality of small areas and at least one spare area to replace a defect area in the user data recording area, the method comprising the steps of:

iteratively executing a verification operation on small areas of a recording area;

counting how many times an error is detected for each small area of the recording area during iterative execution of the verification operation; and allocating, when the number of error detection times counted for a small area is greater than or equal to a predefined value, an available one of the at least one spare area to the small area; and wherein the step of allocating an available spare area further comprises the step of: allocating available ones of the at least one spare area to small areas adjacent to the small area in which the number of error detection times counted for the small area is greater than or equal to the predefined value.

* * * * *